United States Patent [19]

Gordon

[11] Patent Number: 4,877,125

[45] Date of Patent: Oct. 31, 1989

[54] CONVEYOR SKIRTBOARD MOUNTING ASSEMBLY

[75] Inventor: James R. Gordon, Benton, Ill.

[73] Assignee: Gordon Belt Scrapers, Inc., Benton, Ill.

[21] Appl. No.: 222,021

[22] Filed: Jul. 21, 1988

[51] Int. Cl.⁴ ............................................. B65G 21/20
[52] U.S. Cl. .................................... 198/836; 198/525; 403/348
[58] Field of Search .................... 198/525, 836, 860.3, 198/860.5; 403/348, 349

[56] References Cited

U.S. PATENT DOCUMENTS

| | | |
|---|---|---|
| 1,671,241 | 5/1928 | Hagger . |
| 2,031,054 | 2/1936 | McCarthy . |
| 2,344,832 | 3/1944 | Rosengren . |
| 2,352,045 | 6/1944 | Von Opel . |
| 3,568,263 | 3/1971 | Meehan . |
| 3,811,157 | 5/1974 | Schenk ............................ 403/349 |
| 4,664,252 | 5/1987 | Galbraith .......................... 403/348 |

FOREIGN PATENT DOCUMENTS

| | | | |
|---|---|---|---|
| 2418458 | 10/1975 | Fed. Rep. of Germany ...... | 198/836 |
| 967894 | 10/1982 | U.S.S.R. .............................. | 198/836 |

*Primary Examiner*—Joseph E. Valenza
*Attorney, Agent, or Firm*—Kinzer, Plyer, Dorn, McEachran & Jambor

[57] ABSTRACT

A skirtboard member is adjustable and replaceably mounted on a wall above a belt conveyor by a mounting assembly including a cam member molded from a tough, durable resilient resin (e.g., urethane); a key aperture and two radial keyways in the cam member are aligned with two cam ramps that each end in a key latching depression. A key including a shaft and two radial key elements is inserted through the cam member aperture and keyways and twisted to drive the key elements along the ramps to latched position, where a head on the key clamps the skirtboard member on the wall.

15 Claims, 1 Drawing Sheet

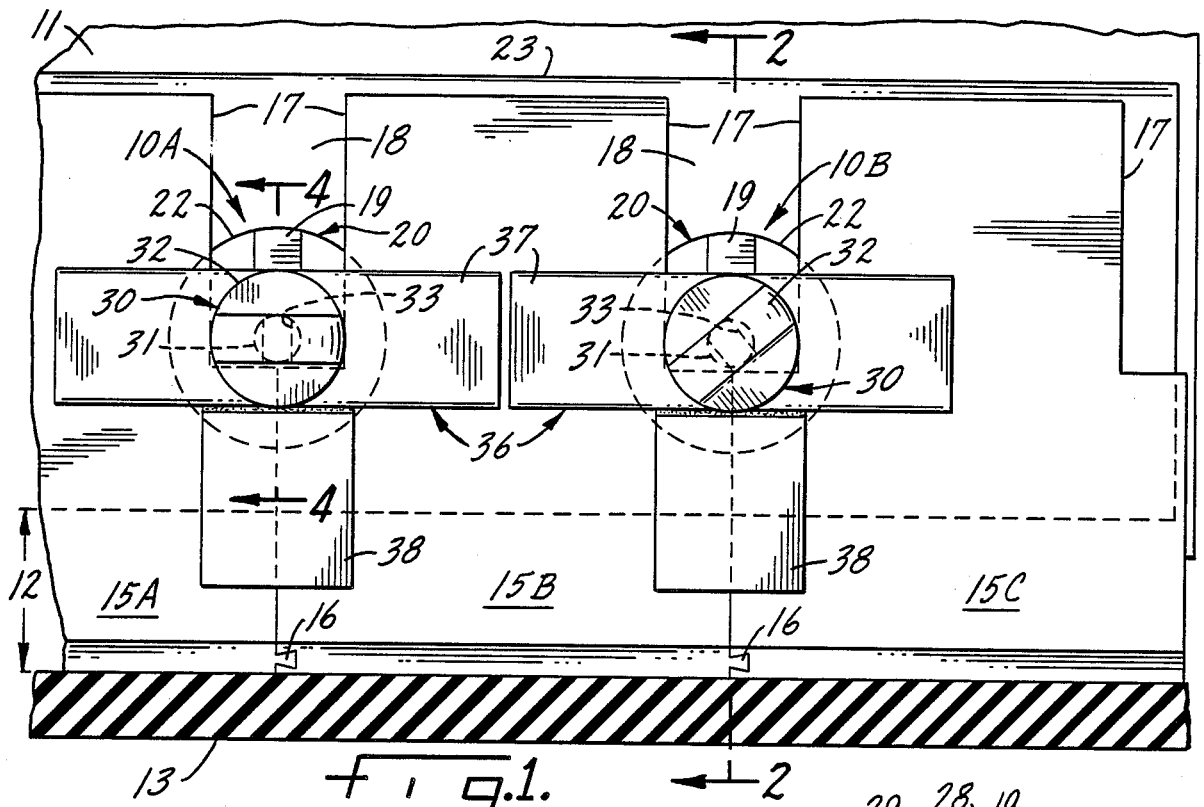
Fig. 1.
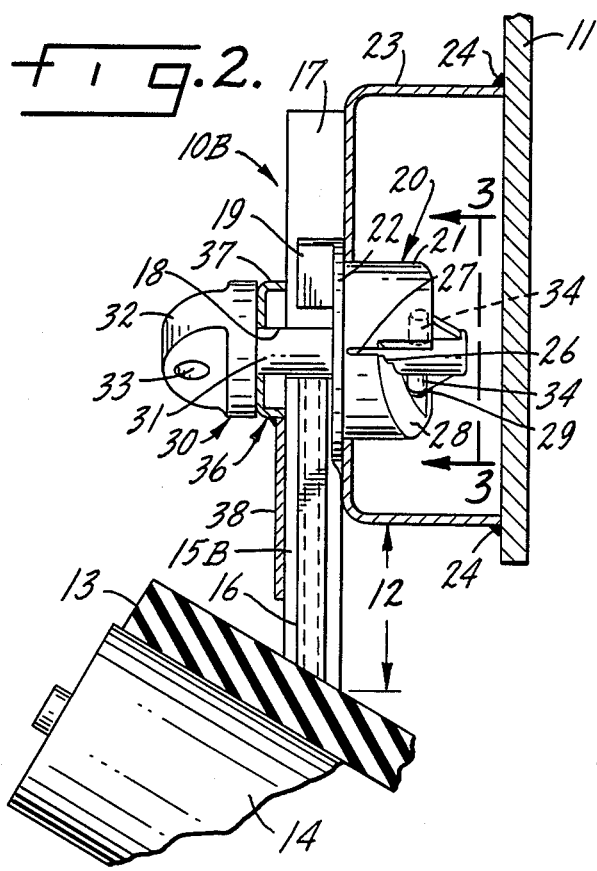
Fig. 2.
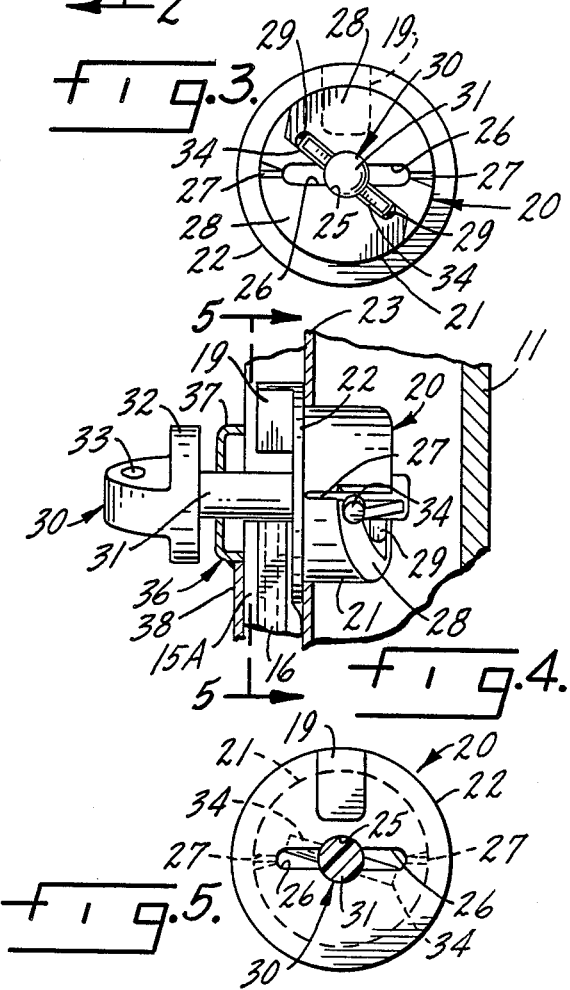
Fig. 3.
Fig. 4.
Fig. 5.

CONVEYOR SKIRTBOARD MOUNTING ASSEMBLY

BACKGROUND OF THE INVENTION

At an input station on an endless belt conveyor, as used for transporting coal, ore, sand, gravel or other such materials, spillage of the conveyed material over the edges of the belt may present a substantial problem. Such spillage is usually controlled by a covered chute having fixed walls extending along the edges of the conveyor belt for a substantial distance downstream from the input location. Rigid chute walls engaging the belt edges, however, would create undue friction and cause excessive wear on the belt in addition to overloading the conveyor drive. Consequently, it has been conventional practice to locate the chute walls a short distance above the edges of the conveyor belt and to mount flexible rubber or resin skirtboards, sometimes referred to as skirtboard aprons, on the chute walls to close the resulting gap.

A number of relatively successful arrangements have been provided for mounting flexible, resilient skirtboards on the input chute walls for belt conveyors. Many of these have provided for vertical adjustment of the skirtboards or aprons to compensate for wear on their edges adjacent the moving belt. Thus, skirtboards equipped with vertically adjustable aprons of rubber, resin, canvas, or other resilient materials are described in Roberts U.S. Pat. Nos. 2,593,610 and in Clegg 3,499,523. A substantially improved vertically adjustable skirtboard mounting for use with a conveyor is described in Gordon U.S. Pat. No. 4,231,471. Another effective skirtboard mounting system, particularly notable for its capability of quick release and re-mounting of the skirtboard to avoid any requirement for shutdown of the conveyor system, is disclosed in Gordon U.S. Pat. No. 4,436,446.

Yet another prior conveyor skirtboard mounting arrangement, in which the skirtboard is formed by a multiplicity of individual apron segments, is described in Stahura U.S. Pat. No. 4,236,628. In that arrangement the individual skirtboard sections interfit with each other along their edges, as in a tongue and groove arrangement, so that they can slide vertically relative to each other and still form a substantially continuous skirtboard along the chute wall. This arrangement provides additional flexibility, compared with skirtboard mounts that utilize continuous elongated aprons. The overall construction, however, entails the use of a relatively complex and expensive mounting plate that may not always do an adequate job of holding the skirtboard sections in the desired position immediately adjacent the edges of the conveyor belt.

SUMMARY OF THE INVENTION

It is a principal object of the present invention, therefore, to provide a new and improved skirtboard mounting assembly for a conveyor belt installation, applicable to either a continuous skirtboard or a multi-section skirtboard, that affords a firm mounting of the skirtboard on a chute wall in a fixed but adjustable vertical position and that allows for maximum flexibility with respect to adjustment of the skirtboard to compensate for wear, whether ordinary or unusual.

A related object of the invention is to provide a new and improved skirtboard mounting assembly for use with a belt conveyor that combines minimum cost with maximum durability and flexibility of operation.

Accordingly, the invention relates to a skirtboard mounting assembly for a belt conveyor installation including a wall positioned a short gap distance above a conveyor belt and a replaceable skirtboard member extending downwardly from the wall to close the gap between the wall and the belt. The mounting assembly comprises a cam member having a key aperture extending therethrough, at least one keyway projecting radially from the key aperture, a cam ramp starting at a low point on one end of the cam member, adjacent the keyway, and extending arcuately away from that point, and key latching means located at the end of the cam ramp farthest from the keyway. Means are provided for mounting the cam member on the wall with the key aperture approximately normal to the wall. The assembly further comprises a key comprising a shaft, a head substantially larger than the cam member key aperture on one end of the shaft, and a key element projecting radially from the other end of the shaft. The dimensions and configuration of the cam member and the key are complementary to each other so that the key element and shaft of the key may be inserted through the key aperture and keyway of the cam member with the key shaft fitting closely in the aperture; the key is rotated to move its key element along the cam ramp into engagement with the key latching means, and the key head firmly clamps a skirtboard member onto the wall.

BRIEF DESCRIPTION OF THE DRAWINGS

FIG. 1 is a side elevation view of a short end portion of a skirtboard mounting assembly for a belt conveyor constructed in accordance with a preferred embodiment of the present invention;

FIG. 2 is a section view taken approximately as indicated by line 2—2 in FIG. 1;

FIG. 3 is a detail view taken approximately as indicated by line 3—3 in FIG. 2;

FIG. 4 is a detail sectional view taken approximately as indicated by line 4—4 in FIG. 1; and FIG. 5 is a detail view taken approximately as indicated by line 5—5 in FIG. 4.

DESCRIPTION OF THE PREFERRED EMBODIMENT

FIG. 1 illustrates two skirtboard mounting assemblies 10 for a belt conveyor installation, both mounted on an input chute wall 11. The mounting assembly 10A at the left-hand side of FIG. 1 is shown in an unlatched condition, in which a skirtboard section 15A can be adjusted in height or removed for replacement. The mounting assembly 10B at the right-hand side of FIG. 1 is shown in its latched condition, firmly mounting a skirtboard section 15C in position to cooperate with a conveyor belt 13 supported on a roller 14 (FIG. 2). The skirtboard members 15A–15C close the gap 12 between chute wall 11 and belt 13. The intermediate skirtboard section 15B is clamped along its right-hand side by assembly 10B but is not tightly clamped by assembly 10A: mounting assembly 10B would be released, as described hereinafter, for adjustment of skirtboard member 15B.

The three skirtboard members 15A–15C all have the same construction. Each is a section of a relatively thick sheet (e.g., 0.75 inch) of a tough, durable, resilient rubber or resin having a dovetail configuration 16 along the mating vertical edges of adjacent sections. Each skirtboard member is cut away along the upper vertical edges at both sides, as indicated at locations 17 in FIG. 1. Thus, the cutaway portions 17 in skirtboard members 15A—15C afford vertical adjustment slots 18 aligned with the skirtboard mounting assemblies such as assemblies 10A and 10B.

Each of the skirtboard mounting assemblies 10A and 10B includes a cam member 20, preferably molded from a tough, durable resilient resin. A preferred resin is polyurethane, preferably with a durometer hardness in the range of about 95A to 70D. Each cam member 20 includes a body 21, shown as having a circular peripheral configuration, with a flange 22 and projection 19 at one end of the cam member body. Cam member body 21 is mounted in a circular aperture in a metal bracket 23 of C-shaped cross-sectional configuration that is affixed to chute wall 11 by appropriate means such as welds 24. A tight fit should be employed.

Cam member 20 has a circular key aperture 25 (FIGS. 3 and 5) that extends axially through the cam member body 21. Two keyways 26 project radially outwardly from aperture 25. Cam member body 21 also has two narrow slots 27 that extend from the two keyways 26 out to the edge of the cam member body; slots 27 do not extend into the peripheral flange 22 of cam member 20. There are two cam ramps 28 on cam member body 21. Each ramp 28 starts at a low point on the end of cam body 21 facing chute wall 11 and extends arcuately away from that low point for about 135°. At the outer end of each ramp 28 there is a shallow key latch groove 29.

Each of the two skirtboard mounting assemblies 10A and 10B includes a key 30. Each key 30 comprises an elongated shaft 31 of circular external configuration that fits tightly into the key aperture 25 in the cam member body 21. At one end of shaft 31 there is a head 32, preferably of circular configuration, that has a diameter large enough to cover the central aperture through cam member body 21, including its keyways 26. The head 32 of key 30 may include a transverse aperture 33 to permit insertion of a rod, such as a screwdriver shaft, for turning key 30 as described hereinafter. At the other end of shaft 31, key 30 includes two transverse key elements 34, one for each of the two cam member ramps 28.

Each of the two skirtboard mounting assemblies 10A and 10B also includes a clamp member 36. Clamp member 36 comprises a metal main clamp element 37 which, in cross section, is of a shallow C-shaped configuration as shown in FIGS. 2 and 4. In the preferred construction, particularly as shown in FIGS. 1 and 2, a metal plate 38 is welded to clamp element 37, projecting downwardly from the main clamp element over the joint between two adjacent skirtboard sections, such as the joint between skirtboard members 15A and 15B or that between the adjacent skirtboard members 15B and 15C.

In mounting the skirtboard members, such as members 15A–15C, on chute wall 11, the first step is to mount the cam members 20 in bracket 23. This is done simply by inserting each of the cam member bodies 21 into an aperture in the bracket, in the orientation shown for cam member bodies 21 in FIGS. 1, 2 and 4, with projection 19 disposed upwardly as shown. A pair of adjacent skirtboard members, such as members 15A and 15B, joined along their dovetail edges 16, are then placed over each cam member body 21 approximately in the positions shown in FIG. 1. A clamp member 36 is next placed in position over each joint adjacent skirtboard sections. The key 30 for each skirtboard mounting assembly is then inserted, in the orientation shown for assembly 10A in FIG. 1, through the central key aperture 25 (FIG. 5). A slight rotation of key 30 then brings its two key elements 34 onto the lowermost points on the two cam ramps 28 as shown in FIGS. 4 and 5. At this stage, the mounting of the skirtboard sections (e.g., members 15A and 15B) on bracket 23 is quite loose, as is the mounting of clamp member 36.

The key 30 is next rotated in a clockwise direction so that its key elements 34 ride up the two cam ramps 28. This rotational movement of key 30 drives key 30 toward clamp member 37 and toward skirtboard members 15A and 15B, from left to right as seen in FIGS. 2 and 4. After a rotary movement of approximately 135°, the two key elements 34 ride up over the lips of latching grooves 29 at the end of ramps 28 and snap into place, effectively locking key 30 in the position shown for assembly 10B in FIG. 1, the same position as illustrated in FIGS. 2 and 3. At this juncture, the head 32 of key 30, acting through clamp member 36, firmly anchors skirtboard members 15A and 15B against bracket 23, precluding any further movement of the skirtboard members relative to the bracket. That is, the head 32 of key 30 effectively clamps each of the two skirtboard members in fixed position relation to wall 11. With the vertical position of the skirtboard members appropriately adjusted (they slide readily in a vertical direction as long as the skirtboard mounting assembly is in the position shown for assembly 10A) gap 12 is fully closed and spillage of material from conveyor 13 is precluded.

At a subsequent time, after conveyor 13 has been in use, the bottom edges of skirtboard members 15A–15C may have worn away enough to allow some undesired spillage over the outer edge of the conveyor belt. To correct this condition, the keys of mounting assemblies 10A and 10B which have been in the position shown in assembly 10B, are rotated counterclockwise back to the position indicated for assembly 10A in FIG. 1. This releases the skirtboard members so that their vertical positions can be re-adjusted to compensate for wear. When this has been accomplished, keys 30 are again rotated clockwise to tighten up the skirtboard mounting assemblies and again securely mount the skirtboard members in fixed vertical positions with respect to wall 11.

As will be apparent from the foregoing description, bracket 23, though desirable in many installations, is not essential to operation of the skirtboard mounting assemblies of the present invention. That is, if wall 11 is near enough to the outer edge of belt 13, the main cam member body 21 of each skirtboard mounting assembly can be mounted in an appropriate aperture in wall 11, eliminating bracket 23. This is possible because all of the operations required for mounting the assemblies 10A and 10B and the skirtboards on wall 11 are accomplished from the exposed outer side of that wall, the left-hand side as seen in FIGS. 2 and 4.

Clamp members 36, like bracket 23, though desirable, may also be eliminated from the skirtboard mounting assemblies. The purpose of each clamp member 36 is to spread the clamping force of one assembly across the surfaces of the clamped skirtboard members. A similar effect can be obtained by enlarging the heads 32 on keys 30 so that they distribute the clamping force over an appreciable area of each skirtboard section.

In the drawings, the skirtboard is shown as made up of individual sections 15A, 15B, 15C, etc. A skirtboard construction of this kind is preferred because if any individual segment is damaged it can be readily replaced without the necessity of replacing the entire skirtboard. Also, if wear on the skirtboard members is uneven, adjustment or replacement can be carried out without disturbing other portions of the skirtboard. However, it will be apparent that the skirtboard mounting assemblies of the present invention, such as assemblies 10A and 10B can be employed quite readily with a continuous elongated skirtboard. That is, the invention can be employed equally well with a continuous skirtboard as with a sectionalized skirtboard.

To assure their retention in bracket 23 or in wall 11 if mounted directly in the wall, the cam members 20 should fit tightly into the bracket or wall. As an aid to assuring a tight fit, so that the cam members are not readily dislodged during maintenance or replacement operations, the diameter of key shaft 31 may be made slightly oversize with respect to the diameter of key aperture 25 in the main body 21 of cam member 20. With this arrangement, when key 30 is inserted in cam member 20 it forces the cam member outwardly against the encompassing bracket 23 or wall 11. This action is aided by the previously mentioned slots 27 in body 21 of cam member 20.

Skirtboard mounting assemblies constructed in accordance with the present invention allow for ready and convenient adjustment of the vertical positions of the skirtboards. Each mounting assembly is quite inexpensive, consisting primarily of a molded resin cam member and a molded resin key that fits into that cam member. Mounting of the cam members on the chute wall or on a bracket on that wall is effected, in each instance, by means of a simple round hole in the wall or bracket. With no complex moving parts, springs, or the like, the skirtboard mounting assemblies last for extended periods and require essentially no maintenance. Thus, they combine minimum cost with maximum durability and flexibility of operation.

What is claimed is:

1. A mounting assembly for a belt conveyor installation including a wall positioned a short gap distance above a conveyor belt and a replaceable skirtboard member extending downwardly from the wall to close the gap between the wall and the belt, the mounting assembly comprising:
   a cam member having a key aperture extending therethrough, at least one keyway projecting radially from the key aperture, a cam ramp starting at a low point on one end of the cam member, adjacent the keyway, and extending arcuately away from that point, and key latching means located at the end of the cam ramp farthest from the keyway;
   means for mounting the cam member on the wall with the key aperture approximately normal to the wall;
   a key comprising a shaft, a head substantially larger than the cam member key aperture on one end of the shaft, and a key element projecting radially from the other end of the shaft;
   the dimensions and configuration of the cam member and the key being complementary to each other so that the key element and shaft of the key may be inserted through the key aperture and keyway of the cam member with the key shaft fitting closely in the aperture;
   the key being rotated relative to the cam member to move the key element along the cam ramp into engagement with the key latching means so that the key head firmly clamps a skirtboard member onto the wall.

2. A skirtboard mounting assembly according to claim 1 in which the cam member is a unitary molded member of a tough, durable resilient resin.

3. A skirtboard mounting assembly according to claim 2 in which the key is a unitary molded member of a tough, durable, resilient resin.

4. A skirtboard mounting assembly according to claim 2 in which the key latching means comprises a shallow depression molded into the cam member at the end of the cam ramp.

5. A skirtboard mounting assembly according to claim 1 in which:
   the cam member includes two keyways oriented at approximately 180° to each other, two cam ramps, and two latching means; and
   the key includes two key elements, one for each keyway.

6. A skirtboard mounting assembly according to claim 5 in which the cam member and the key are each a unitary molded member of a tough, durable, resilient resin.

7. A skirtboard mounting assembly according to claim 6 in which the key latching means comprises two shallow depressions, each molded into the cam member at the end of one of the cam ramps.

8. A skirtboard mounting assembly according to claim 1 in which:
   the cam member mounting means comprises a metal bracket affixed to the wall;
   and the cam member includes a radial flange; and
   the cam member is tightly fitted into an aperture in the bracket with its flange engaging the bracket.

9. A skirtboard mounting assembly according to claim 1 and further comprising:
   a clamp member interposed between the key head and the skirtboard member to distribute clamping force across the surface of the skirtboard member.

10. A skirtboard mounting assembly according to claim 9 in which the clamp member is of shallow, generally C-shaped cross-sectional configuration.

11. A skirtboard mounting assembly according to claim 9 in which the clamp member spans a joint between two adjacent skirtboard members, and includes an integral clamp member extension projecting downwardly, toward the conveyor belt, over that joint.

12. A mounting assembly for removably securing a movable member to a wall, comprising:
   a cam member having a key aperture extending therethrough, at least one keyway projecting radially from the key aperture, a cam ramp starting at a low point on one end of the cam member, adjacent the keyway, and extending arcuately away from that point, and key latching means located at the end of the cam ramp farthest from the keyway;
   means for mounting the cam member on the wall with the key aperture approximately normal to the wall;
   a key comprising a shaft, a head substantially larger than the cam member key aperture on one end of the shaft, and a key element projecting radially from the other end of the shaft;
   the dimensions and configuration of the cam member and the key being complementary to each other so that the key element and shaft of the key may be inserted through the key aperture and keyway of the cam member with the key shaft fitting closely in the aperture;

the key being rotated relative to the cam member to move the key element along the cam ramp into engagement with the key latching means so that the key head firmly clamps a skirtboard member onto the wall.

13. A mounting assembly according to claim 12 in which:

the cam member includes two keyways oriented at approximately 180° to each other, two cam ramps, and two latching means; and the key includes two key elements, one for each keyway.

14. A mounting assembly according to claim 13 in which the cam ember and the key are each a unitary molded member of a tough, durable, resilient resin.

15. A mounting assembly according to claim 14 in which the key latching means comprises two shallow depressions, each molded into the cam member at the end of one of the cam ramps.

* * * * *